United States Patent
Vath et al.

(10) Patent No.: US 7,665,759 B2
(45) Date of Patent: Feb. 23, 2010

(54) COVER PLATE FOR AN AIRBAG MODULE

(75) Inventors: Klaus Vath, Leidersbach (DE); Wilhelm Schnabel, Niedernberg (DE); Hans Martin Hauck, Rossdorf (DE); Rudolf Helfrich, Aschaffenburg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/000,205

(22) Filed: Dec. 10, 2007

(65) Prior Publication Data

US 2008/0150262 A1 Jun. 26, 2008

Related U.S. Application Data

(63) Continuation of application No. PCT/DE2006/001003, filed on Jun. 6, 2006.

(30) Foreign Application Priority Data

Jun. 8, 2005 (DE) .................. 10 2005 027 271

(51) Int. Cl.
B60R 21/203 (2006.01)
(52) U.S. Cl. .................. 280/728.3; 280/731
(58) Field of Classification Search .............. 280/728.3, 280/731, 732
See application file for complete search history.

(56) References Cited

U.S. PATENT DOCUMENTS

| | | | | |
|---|---|---|---|---|
| 5,431,436 A * | 7/1995 | Mossi et al. | ............. | 280/728.1 |
| 5,435,596 A * | 7/1995 | Rose et al. | ............... | 280/728.2 |
| 5,951,039 A * | 9/1999 | Severinski et al. | ....... | 280/730.2 |
| 6,047,984 A | 4/2000 | Preisler et al. | | |
| 6,203,056 B1 * | 3/2001 | Labrie et al. | ............. | 280/728.3 |
| 6,214,442 B1 | 4/2001 | Mizutani et al. | | |
| 6,354,623 B1 * | 3/2002 | Delmastro | .................. | 280/732 |
| 6,409,208 B1 | 6/2002 | Frisch et al. | | |
| 6,412,812 B1 | 7/2002 | Ford | | |
| 6,929,280 B2 * | 8/2005 | Yasuda et al. | ............. | 280/728.2 |
| 6,955,376 B1 * | 10/2005 | Labrie et al. | ............. | 280/728.3 |
| 7,004,497 B2 * | 2/2006 | Thomas et al. | ........... | 280/728.3 |
| 7,007,970 B2 * | 3/2006 | Yasuda et al. | ............. | 280/728.3 |
| 7,100,941 B2 * | 9/2006 | Riha et al. | ................ | 280/728.3 |
| 7,159,897 B2 * | 1/2007 | Worrell et al. | ............... | 280/731 |
| 7,178,825 B2 * | 2/2007 | Fujii et al. | ................ | 280/728.3 |
| 7,237,797 B2 * | 7/2007 | Dailey et al. | ............. | 280/728.3 |
| 2003/0038460 A1 | 2/2003 | Sczeburek et al. | | |
| 2004/0051280 A1 * | 3/2004 | Anaya et al. | ............. | 280/728.3 |

(Continued)

FOREIGN PATENT DOCUMENTS

DE 199 41 433 A1 3/2000

(Continued)

*Primary Examiner*—Paul N Dickson
*Assistant Examiner*—Nicole Verley
(74) *Attorney, Agent, or Firm*—Foley & Lardner LLP

(57) ABSTRACT

A cover plate for an airbag module, such as a driver side airbag module. The cover plate includes a cover part and at least one wall which extends in a generally perpendicular manner in relation to the cover part. In order to prevent indentation areas from forming on the visible surface of the cover part on the transition points towards the walls and to provide the simple deformation of the airbag cover from the production tool, the wall extends, when seen in the cross-section thereof, at distances which are short in relation to the length of the wall, alternating in different directions.

8 Claims, 4 Drawing Sheets

U.S. PATENT DOCUMENTS

2004/0130131 A1 7/2004 Thomas et al.
2007/0278772 A1* 12/2007 Burghardt et al. ........... 280/731

FOREIGN PATENT DOCUMENTS

| | | |
|---|---|---|
| DE | 299 20 024 U1 | 5/2000 |
| DE | 601 02 363 T2 | 10/2001 |
| EP | 0 609 959 A1 | 8/1994 |
| EP | 1 238 870 B1 | 9/2002 |
| EP | 1 348 601 A2 | 10/2003 |
| GB | 2 314 299 A | 12/1997 |
| GB | 2 401 838 A | 11/2004 |
| WO | WO 98/22312 A1 | 5/1998 |
| WO | WO 01/72558 A1 | 10/2001 |

* cited by examiner

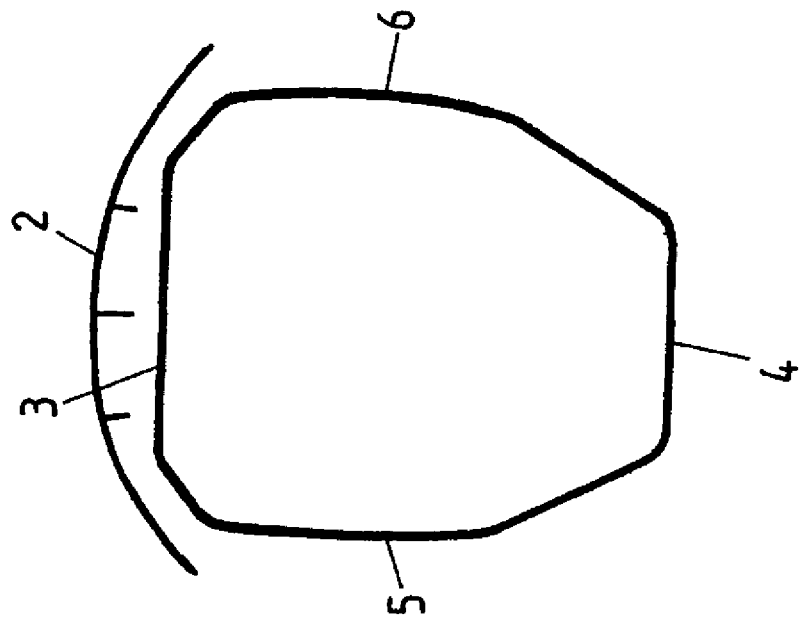
FIG 2 (II-II) PRIOR ART
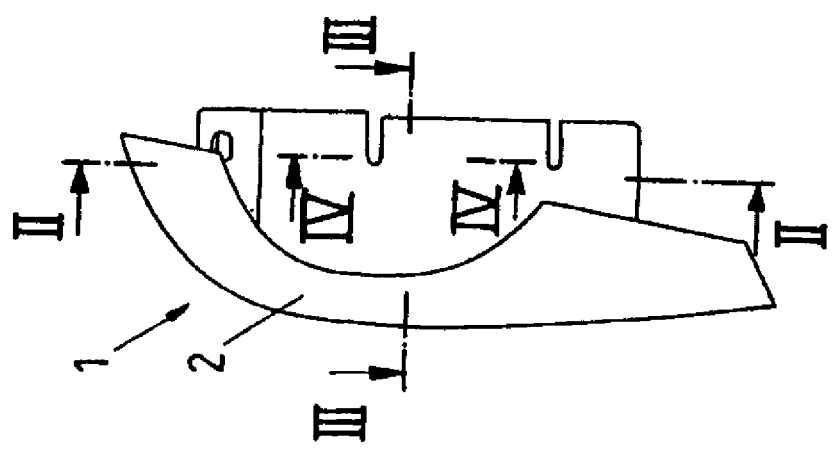
FIG 1 PRIOR ART (IV-IV) PRIOR ART (III-III) PRIOR ART

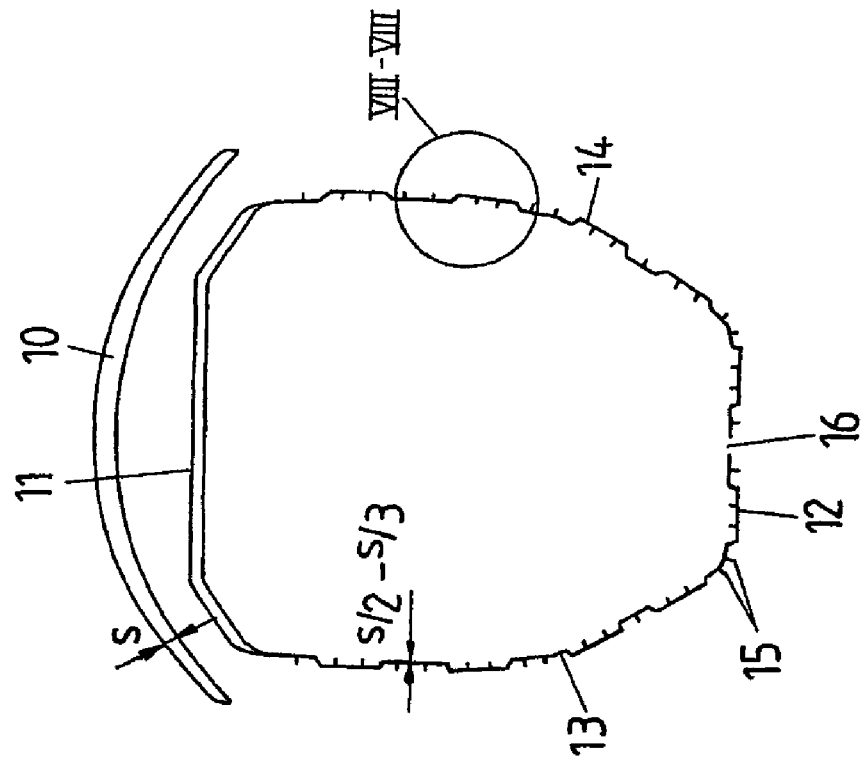
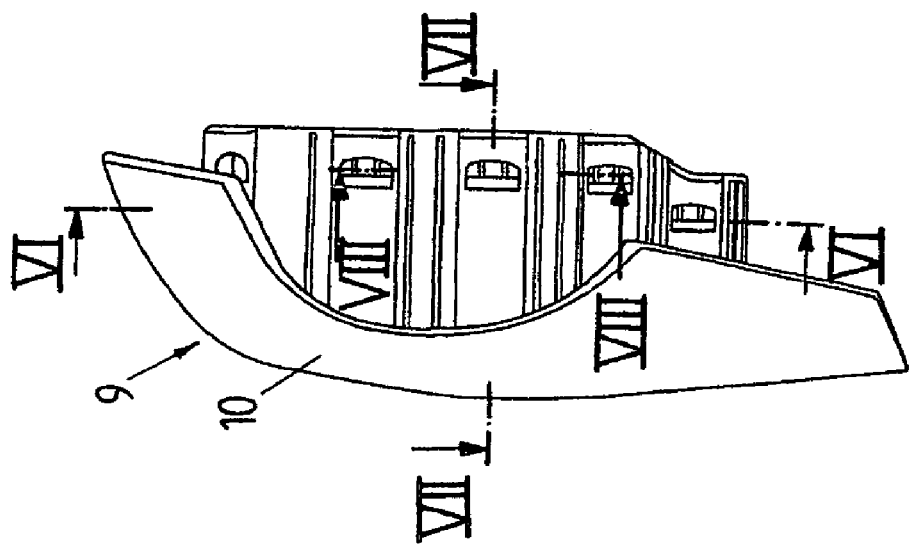

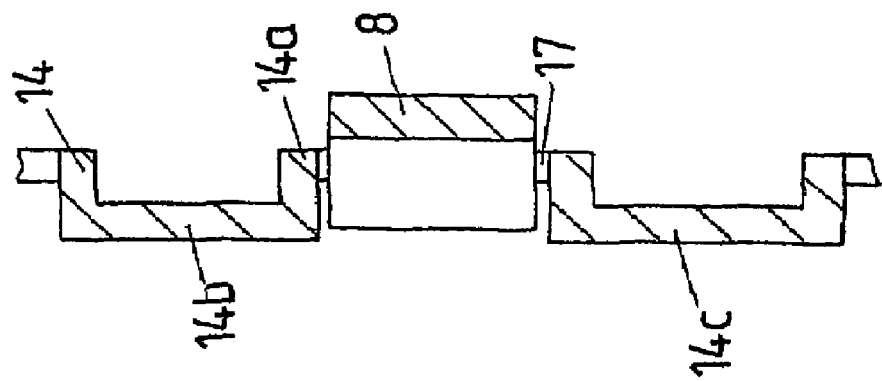
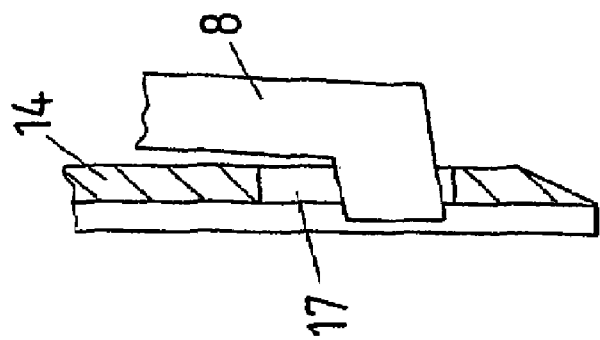

COVER PLATE FOR AN AIRBAG MODULE

CROSS-REFERENCE TO RELATED PATENT APPLICATIONS

This is a continuation of International Application PCT/DE2006/001003 which has an international filing date of Jun. 6, 2006; this International Application was not published in English, but was published in German as WO 2006/131109.

BACKGROUND OF THE INVENTION

The invention relates to a cover plate for an airbag module.

A cover plate for an airbag module, such as for a driver's airbag module, generally has a cover part, i.e. the cover plate, and a plurality of interconnected walls which are connected to the cover part. The walls are generally a front and a rear wall and two side walls which connect the front and rear wall to each other. The walls run rectilinearly or slightly curved in cross section.

Existing cover parts and walls, generally have generally the same wall thickness. Since they are manufactured as a single piece, i.e., by injection molding, at the transition points from the cover part to the walls the manufacturing process may cause sink marks to form on the visible surface of the cover part.

The sink marks can be avoided if the ratio of the wall thickness to the thickness of the cover part is 1:3 to at maximum 1:2. In existing airbag plates, thinned portions are provided on the walls at the transition points to the cover part in order to achieve the abovementioned wall thickness ratio. After the manufacturing, the thinned portions, which constitute undercuts, have to be demolded by a mechanism of slides or by forced demolding. Both types of demolding have disadvantages. Forced demolding may result in deformation of the component. Slides are costly and limit the possibility of designing the tearing seam of the cover plate.

The invention is therefore based on the object of avoiding sink marks on the visible surface of the cover part at the transition points to the walls, with the intention being to provide easy demolding of the airbag plate from the production tool.

In a cover plate for an airbag module, such as a driver's airbag module, the cover plate having a cover part and at least one wall which runs perpendicular to the cover part, the wall, as seen in its cross section, runs in different directions in an alternating manner at distances which are short in relation to the length of the wall. The wall runs in a circuitous manner. With such a cross-sectional profile of the wall, it is possible to design said wall to be substantially thinner than a wall of the prior art, with the same stiffness being obtained in comparison to the previous wall. The abovementioned ratio of the wall thickness to the thickness of the cover part can therefore be achieved without undercuts. Therefore, sink marks can be avoided on the surface of the cover part and, no complicated demolding tools are required. Furthermore, material and therefore also weight are saved. In comparison to the walls of the prior art, a greater freedom of design for the tearing seam of the cover plate is also obtained.

Similar advantages as with a circuitous cross section of the wall can also be obtained if the cross section runs in a curved manner, for example sinusoidally.

Openings for latching a generator support to the cover plate are provided at wall sections which bear against those wall regions of the generator support which are provided with fastening elements. The cross section of the wall changes in direction at the edges of the openings.

The thickness of the wall is half to a third of the thickness of the cover part. In order, at this wall thickness, to achieve an increase in the strength of the wall or in order to further reduce the wall thickness, the wall may have reinforcing ribs. The ribs do not require any additional demolding tools. The reinforcing ribs run generally perpendicular from the cover part without being connected to the cover part.

SUMMARY

One embodiment of the invention relates to a cover part for an airbag module having four interconnected walls, of which three that run in different directions in an alternating manner in cross section.

The two side walls and the rear wall are designed in accordance with the invention.

At least one wall is at least partially slit generally perpendicular with respect to the cover part in order to make it easier for the wall to deform elastically during latching to a generator support.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 shows the side view of a cover plate of the prior art.

FIG. 2 shows a section II-II through the cover plate of FIG. 1.

FIG. 5 shows the side view of a cover plate according to an embodiment of invention.

FIG. 6 shows a section VI-VI through the cover plate of FIG. 5.

FIG. 7 shows a section VII-VII through the cover plate of FIG. 5.

FIG. 8 shows a section VIII-VIII through the cover plate of FIG. 5.

DETAILED DESCRIPTION

Figure 4:
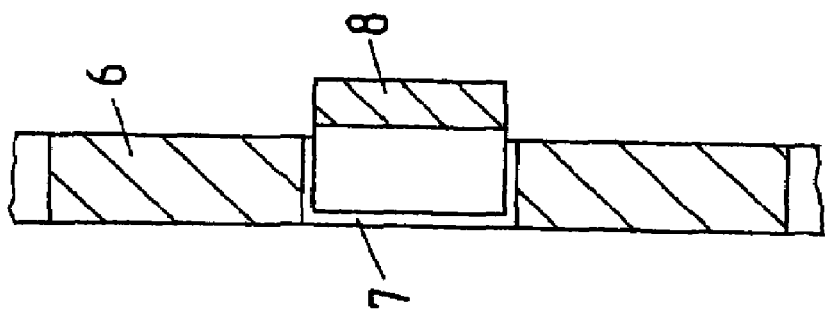
FIG. 4 shows a section IV-IV through the cover plate of FIG. 1.

Referring now to the FIGURES, the cover plate 1 illustrated in FIGS. 1 and 2 has a cover part 2, a front wall 3 and a rear wall 4. Said two walls are connected to each other by side walls 5, 6. While the walls 3, 4 are essentially rectilinear in cross section, the side walls 5, 6 run in a slightly curved manner and are bent inward in the front and rear sections. However, this profile provides little improvement in the strength of the side walls 5, 6 over a straight profile.

Figure 3:
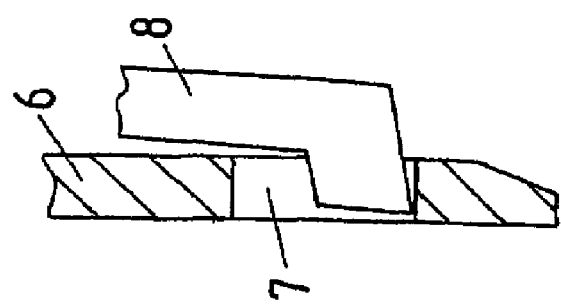
FIG. 3 shows a section III-III through the cover plate of FIG. 1.

Openings, of which one opening 7 is illustrated in FIGS. 3 and 4, are provided in the side walls 5, 6. Latching hooks 8 engage in said openings in order to latch a generator support (not illustrated) to the cover plate 1.

FIGS. 5 and 6 illustrate a cover plate 9 according to an exemplary embodiment. Said cover plate has a cover part 10, a front wall 11 and a rear wall 12. These two walls are connected to each other by side walls 13, 14. The rear wall 12 and the two side walls 13, 14 have a circuitous cross section.

This cross section increases the stiffness of the walls, the walls can therefore be designed to be thinner than the walls of the cover plate 1 of the prior art. In relation to the thickness s of the cover part, the wall thickness is s/2 to s/3. Reinforcing ribs 15 which run generally perpendicular to the cover part 10 but are not connected to the cover plate can be arranged so as to further increase the stiffness of the walls. The rear wall 12 is designed such that it is partially divided by a mechanism of a slit 16 in order to make it easier to connect it to a generator support (not illustrated). Openings, of which one opening 17 is illustrated in FIGS. 7 and 8, are provided in the side walls 13, 14. The latching hooks 8 of the generator support engage in said openings in order to latch the generator support (not illustrated) to the cover plate 9. As illustrated in FIG. 8, the opening 17 is located in an outwardly projecting wall section 14a which is adjoined, in the case of this circuitous cross section, by two inwardly projecting sections 14b, c. As illustrated in FIG. 8, the cross section of the wall changes in direction at the edges of the opening 17.

German priority application 10 2005 027 271.1 filed Jun. 8, 2005, including the specification, claims, abstract and figures, is incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cover plate for an airbag module, comprising:
   a cover part;
   and at least one wall which extends away from the cover part in a direction essentially perpendicular to the cover part,
   wherein the wall, when viewed in a cross section made by sectioning the wall along a plane essentially parallel to the cover part, runs in different directions in an alternating manner at distances which are short in relation to the length of the wall so that the wall runs in a circuitous manner,
   wherein openings are provided for latching a generator support to the cover plate at wall sections which bear against wall regions of the generator support which are provided with fastening elements, and
   wherein the cross section of the wall changes in direction at the edges of the openings.

2. The cover plate as claimed in claim 1, wherein the thickness of the wall is half to a third of the thickness of the cover part.

3. The cover plate as claimed in claim 1, wherein the wall has reinforcing ribs.

4. The cover plate as claimed in claim 3, wherein the reinforcing ribs run away generally perpendicular from a cover plate without being connected to the cover plate.

5. The cover plate as claimed in claim 1, wherein four inter-connected walls are provided, of which three run in different directions in an alternating manner in cross section.

6. The cover plate as claimed in claim 5, wherein two side walls and a rear wall run in different directions in an alternating manner in cross section.

7. The cover plate as claimed in claim 5, wherein at least one wall is at least partially slit generally perpendicular with respect to the cover part.

8. The cover plate as claimed in claim 1, wherein both sides of the wall run in parallel.

* * * * *